UNITED STATES PATENT OFFICE.

EDWARD WATSON, OF GRAND RAPIDS, MICHIGAN.

MANUFACTURE OF FERTILIZERS.

SPECIFICATION forming part of Letters Patent No. 458,744, dated September 1, 1891.

Application filed May 4, 1891. Serial No. 391,545. (No specimens.)

*To all whom it may concern:*

Be it known that I, EDWARD WATSON, a citizen of the United States, residing at Grand Rapids, in the county of Kent and State of Michigan, have invented certain new and useful Improvements in the Manufacture of Fertilizers, set forth in the following specification.

My invention relates to converting into a commercial fertilizer the substance known to renderers of fats as "tank-water," or, when evaporated to a semi-solid consistency, "stick." If this substance be evaporated to dryness, it is deliquescent and cannot be conveniently handled as a commercial product.

In this invention I aim to make a practically dry non-deliquescent product without adding inert matter, which has no value as a fertilizer.

I have found that if tank-water be rendered alkaline and evaporated to dryness it is then less deliquescent, and if I add to it with the alkali some other animal matter which does not possess deliquescent properties, or, if so, to a much less degree, it is when dry still more non-deliquescent, and is practically non-deliquescent for commercial purposes. If a sufficient quantity of alkali be used to make a solution of the animal matter to be mixed with the tank-water or stick, it then unites more intimately with the substance of tank-water, and a much less quantity of such material will accomplish the desired result. I may therefore make a complete or partial solution of the matter which I mix with the tank-water or stick, or I may only render the mixture decidedly alkaline and then reduce it to dryness. I may, for convenience in practice, introduce the alkali first into the tank-water before evaporation. In the use of an alkali I may use any alkaline substance capable of rendering the mixture decidedly alkaline to the test for alkalinity.

Of the products with which I combine the tank-water or stick together with an alkali may be mentioned blood, either liquid or dry blood, bone-meal, glue waste, hoof-meal, ground horn-piths, tankage, or other scraps of flesh, skin, hair, fish wastes, &c. I may in the combination with the substance of tank-water use any one or more of the above-named substances. After thoroughly incorporating all the ingredients the mass is to be dried at as high a temperature as may be practical without a risk of injuring the product thereby, usually at from 250° to 350° Fahrenheit.

It is well known that tank-water or stick has been mixed with other animal or vegetable matter for the purpose of making a commercial fertilizer. By my process I obtain a far more permanent product by the addition of an alkali, which appears to change some of the deliquescent salts of the stick.

In the use of an alkali it is the effect upon the ultimate product that I seek. It is therefore obvious that I do not confine myself to the use of any specific alkali, but would in practice use such as would answer the purpose at the least cost. I have found it unnecessary to fix a definite quantity of alkali, as the addition of sufficient to render the mixture decidedly and freely alkaline is sufficient. If sufficient alkali has been used to dissolve the animal matter with which I mix the tank-water or stick, I may add to the product some substance to neutralize the free alkali, so as to prevent loss of ammonia.

In carrying out my invention it is not necessary to limit the proportions of material. If a solution of animal matter is used, the mixture is more complete and much less will be required. I may add to the semi-solid stick from one-tenth to one-fourth its weight of other animal matter, or the quantity may be increased as much as desirable. The best result is generally obtained by using of dry animal matter from one-third to one-fourth the weight of the stick when evaporated to about 25° Baumé. If liquid blood is used or other liquid material, an allowance must be made for the water it contains.

The following method I have found to give good results: First coagulate the blood by heat. Then press out the free water and make a mixture of about fifteen hundred pounds of concentrated stick and fifteen hundred pounds of the coagulated blood, with the addition of the alkali. Then thoroughly mix the mass and dry it at as high a temperature as is practical without injuring the product by the heat.

The dry-chamber should be heated from 250° to 350° Fahrenheit.

What I claim is—

The process of converting tank-water or stick into a practically dry non-deliquescent fertilizer, which consists in adding thereto a portion of other animal matter practically non-deliquescent and an alkali and drying the product, substantially as and for the purpose specified.

EDWARD WATSON.

Witnesses:
C. L. HARVEY,
C. J. DE YOUNG.